No. 864,080. PATENTED AUG. 20, 1907.
T. COLLINS & E. L. HARTMANN.
CENTRIFUGAL LIQUID SEPARATOR.
APPLICATION FILED OCT. 4, 1906.
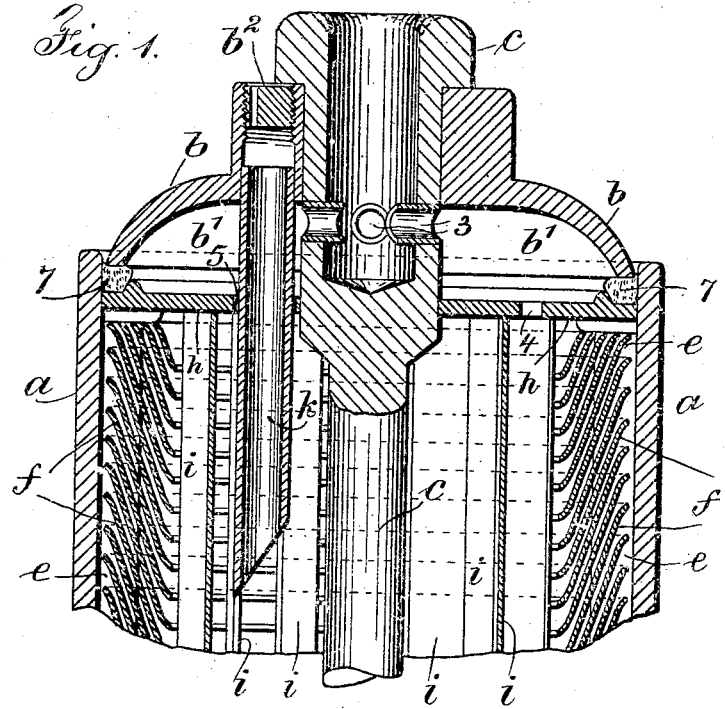
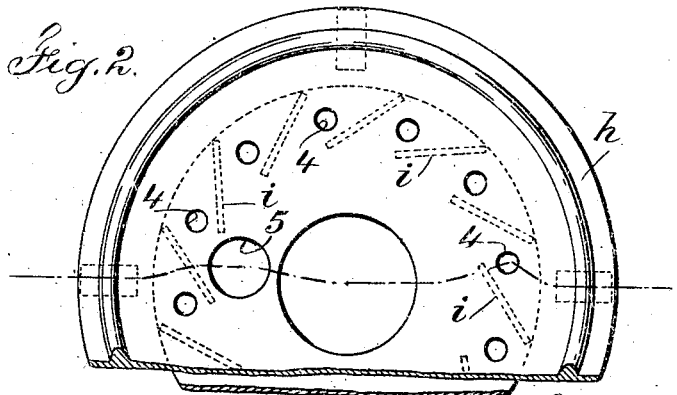
Witnesses
Cha H Smith
Inventors
Thomas Collins
Ernest L Hartmann
by Harold Serrell
their atty

UNITED STATES PATENT OFFICE.

THOMAS COLLINS AND ERNEST L. HARTMANN, OF BAINBRIDGE, NEW YORK, ASSIGNORS TO AMERICAN SEPARATOR COMPANY, OF BAINBRIDGE, NEW YORK, A CORPORATION OF NEW YORK.

CENTRIFUGAL LIQUID-SEPARATOR.

No. 864,080.  Specification of Letters Patent.  Patented Aug. 20, 1907.

Application filed October 4, 1906. Serial No. 337,406.

*To all whom it may concern:*

Be it known that we, THOMAS COLLINS and ERNEST LOUIS HARTMANN, citizens of the United States, residing at Bainbridge, in the county of Chenango and State of New York, have invented an Improvement in Centrifugal Liquid-Separators, of which the following is a specification.

Our invention relates to improvements in centrifugal liquid separators, and the same is an improvement upon the device shown and described in Letters Patent of the United States, granted to us August 1, 1905, #796,189 and #796,190.

In the device of our said patents, the cream tube is secured to the upper annulus disk of the inner member and its free upper end enters a hole in the cover adjacent to the adjustable plug of the cream discharge. We have discovered difficulties in the operation of this device to the extent that occasionally the blue or skim milk would discharge through the cream orifice coming up the outer surface of the cream tube from the upper surface of the annulus disk to which it was secured, and also that the entire cream out-put was not discharged as was manifest in washing out the separator, because a small amount of cream would precede the washing water, all of which it is the object of our present invention to overcome.

In carrying out our invention and as the result of much experiment, we have discovered that by securing the upper end of the cream tube to and sealing the same in the cream discharge opening of the cover and freeing the cream tube from connection with the upper annulus disk so that it passes freely there-through that the aforesaid difficulties are entirely overcome.

The cream tube so called is a conduit of any desired character and in a separator for other liquid, receives and conveys away the liquid of lightest specific gravity.

In the drawing, Figure 1 is a vertical section and partial elevation representing the device of our invention at the upper end of the centrifugal liquid separator, and Fig. 2 is a sectional plan above the top disk of the inner member.

Generally speaking, the construction of our improved centrifugal separator is the same as shown in our before mentioned patents, and therefore we have only shown the upper part of the device to which our present invention peculiarly relates.

The bowl $a$ is preferably cylindrical and is revolved at a high speed. A cover $b$ is provided for the bowl and it is constructed with a central aperture and preferably with two or more radial blades $b^1$ on the under side of the arched cover, as more fully shown in Letters Patent granted to us, August 1, 1905, No. 796,189.

We have shown and prefer to increase the thickness of the cover near the central aperture at the upper end of which is an adjustable plug $b^2$, for the cream discharge seated in a cream discharge aperture, which extends through the cover. This plug may be of any desired character and it is adapted to be turned so as to bring the opening therein either nearer to or further from the axial center of the centrifugal separator so as to regulate the amount of liquid discharged, and in a cream separator, the amount of the cream discharged, and consequently, the consistency thereof.

As in our former patents, we provide a bolt $c$ which passes down through the aperture of the cover and at its upper end is tubular and formed as a nut to overlap the upper end of the cover so as to be able to hold the cover down upon the bowl; the lower edge of the cover fitting within the inner diameter of the bowl and setting upon a rubber or other suitable gasket 7. In the upper end of the bolt $c$, near the lower end of the tubular portion, we provide tube sections 3 for the discharge of the milk or other liquid admitted into the tubular end of the bolt, the same passing through these openings into the centrifugal separator.

As in our aforesaid patents, we provide a liner fitting snugly down into the bowl; this liner comprising several vertical radial bars $e$ and a series of superimposed or nested annulus plates $f$ set obliquely to vertical lines, or in other words, each formed as conic sections. The inner member fitting within the liner comprises as a part thereof an annulus disk $h$ at the top and blades $i$, which in cross-section are set obliquely across radial lines from the center of the bowl and are preferably placed vertical. The top annulus disk $h$ is provided with perforations 4 preferably spaced apart so that there is one between each of the respective blades $i$; the said perforations 4 being preferably arranged on an arc which advantageously intersects the blades $i$.

The liquid is delivered into the centrifugal separator through the tubular upper end of the bolt and through the tube sections 3 and passes to the upper surface of the annulus disk $h$ and through the perforations 4 to the nested annulus plates $f$ below. In this annulus disk $h$ there is a perforation 5 of liberal proportions to receive the cream tube $k$. This tube is preferably constructed similarly to the tube of our aforesaid patents, it passes freely through the perforation 5 of the annulus disk $h$ and is at its upper end secured to and sealed in the cream discharge opening of the cover so that only the liquid which passes through the tube may be discharged through the adjustable plug $b^2$. The clearance thus provided between the exterior of the said tube $k$ and the surface of the annulus disk $h$ acts to prevent any liquid that may lie on top of this annulus disk congregating on the exterior of the tube $k$ and performing any function in so doing.

Where the device is used for the separation of milk from its cream, the blue milk or skim milk which would lie upon the top of the annulus disk $h$ cannot perform any function or in any way act to the detriment of the action of the separator if it also collects on the outside of the cream tube $k$, as the solid connection of the upper part of the tube to the cover effectually prevents any discharge through the plug $b^2$ of anything except the material that passes directly through the tube $k$, and as the cream from the interior of the separator rises, it finds its natural discharge through the tube $k$ and the adjustable plug $b^2$. Where the device is used for the separation of other liquids the lighter liquid would find its discharge through the tube $k$.

The tube $k$ or cream tube, is a conduit of any suitable or desired material or character, and where the centrifugal separator is not employed for the separation of the cream from the skim or blue milk, but for the separation of the parts of other liquids, the said tube $k$ serves as a conduit for conveying away the liquid of lightest specific gravity.

We claim as our invention:

1. In a centrifugal liquid separator, the combination with a bowl and liner, of a cover having a discharge orifice, a conduit for the liquid of lightest gravity, one end of which is securely fastened therein and sealed thereto, and a disk extending over the liner and having an opening through which the said tube freely passes down into the bowl.

2. In a centrifugal liquid separator, the combination with a bowl and liner, of a cover having a discharge orifice and a conduit for the liquid of lightest gravity secured only at one end to the cover in the said discharge orifice, and so made liquid tight, substantially as described.

3. In a centrifugal liquid separator, the combination with a bowl and liner, of a cover having a cream discharge orifice, a cream conduit, one end of which enters and is securely fastened therein and sealed thereto, and a disk extending over the liner and forming a part of an inner member and having perforations for the down discharge of the milk and an opening through which the cream tube freely passes down into the bowl.

Signed by us this 24th day of Sept., 1906.

THOS. COLLINS.
ERNEST L. HARTMANN.

Witnesses:
EDSON C. BURDICK,
W. R. PROUTEY.